United States Patent [19]

Pipon et al.

[11] Patent Number: 4,842,232
[45] Date of Patent: Jun. 27, 1989

[54] CURVED SLIDE MEMBER

[75] Inventors: Yves Pipon; Georges Droulon, both of Flers, France

[73] Assignee: A. & M. Cousin Etablissements Cousin Freres, Orne, France

[21] Appl. No.: 97,634

[22] Filed: Sep. 16, 1987

[30] Foreign Application Priority Data

Sep. 19, 1986 [FR] France ................................ 86 13157

[51] Int. Cl.$^4$ ............................................. F16M 13/00
[52] U.S. Cl. .................................... 248/395; 248/430; 297/330; 297/344
[58] Field of Search ............... 248/429, 430, 424, 425, 248/419, 420, 395, 661, DIG. 13, 298; 297/330, 344

[56] References Cited

U.S. PATENT DOCUMENTS

| | | |
|---|---|---|
| 1,962,789 | 6/1934 | Simpson et al. ..................... 248/430 |
| 2,275,656 | 3/1942 | Saunders ............................. 248/429 |
| 2,953,190 | 9/1960 | Tanaka ................................ 248/429 |
| 3,184,209 | 5/1965 | Colautti .............................. 248/429 |
| 4,275,914 | 6/1981 | Holweg et al. .................. 248/429 X |
| 4,304,386 | 12/1981 | Nagashima et al. ............... 248/429 |
| 4,479,626 | 10/1984 | Kluting et al. ...................... 248/420 |
| 4,534,532 | 8/1985 | Parizet ........................... 248/430 X |

Primary Examiner—Blair M. Johnson
Assistant Examiner—David L. Talbott
Attorney, Agent, or Firm—Becker & Becker, Inc.

[57] ABSTRACT

A curved slide member having an inner section and an outer section, with one of these inner and outer sections being movable relative to the other, which is fixed. A Z-shaped rack is fixedly mounted on one of the inner and outer sections. A pinion is carried by that inner or outer section on which the rack is not mounted, with the pinion meshing with the rack.

5 Claims, 2 Drawing Sheets

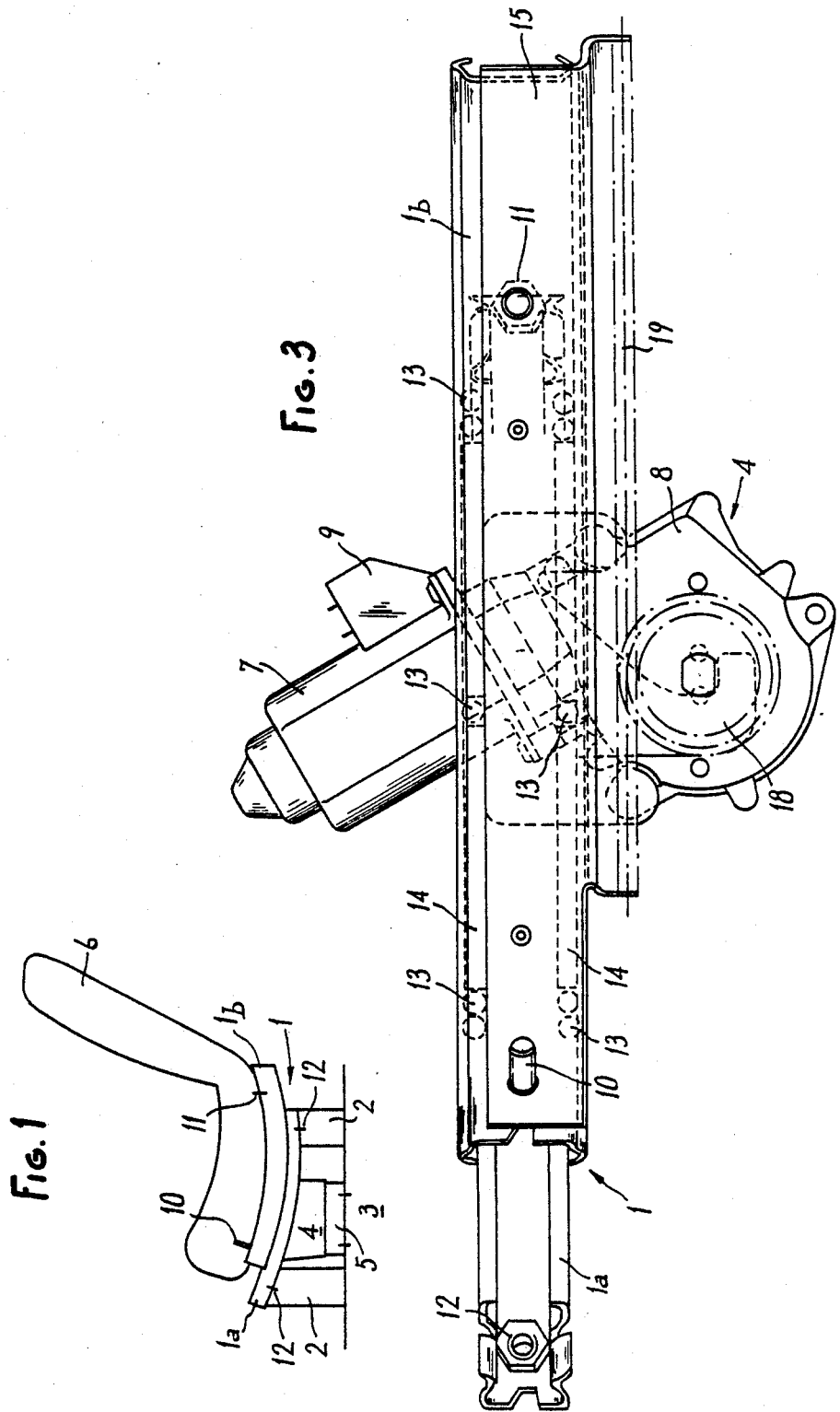

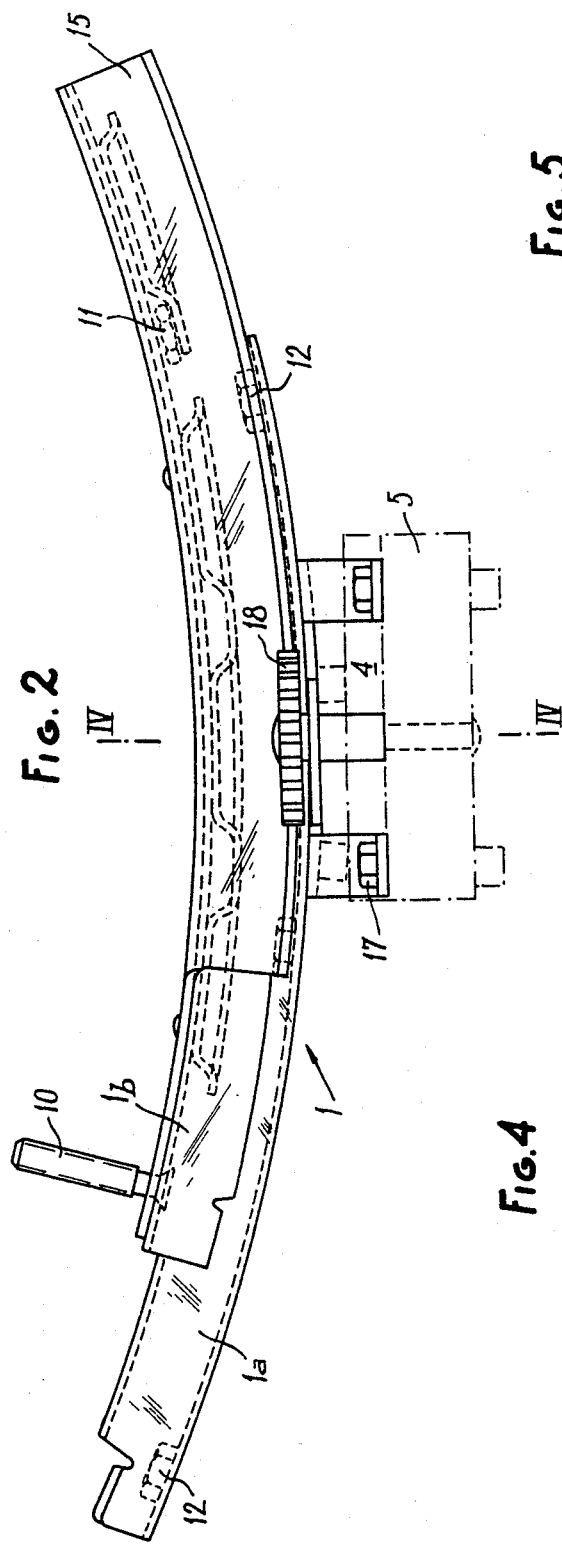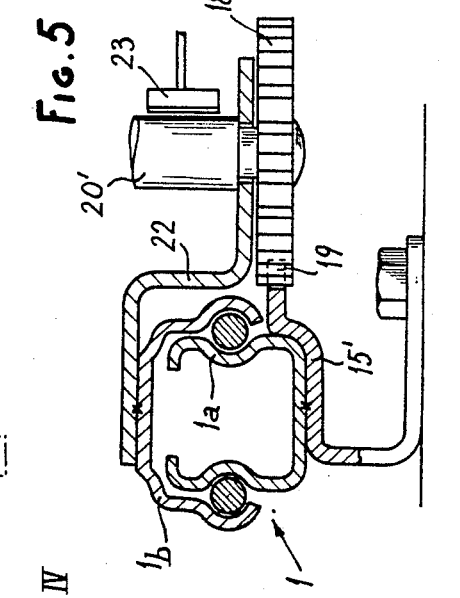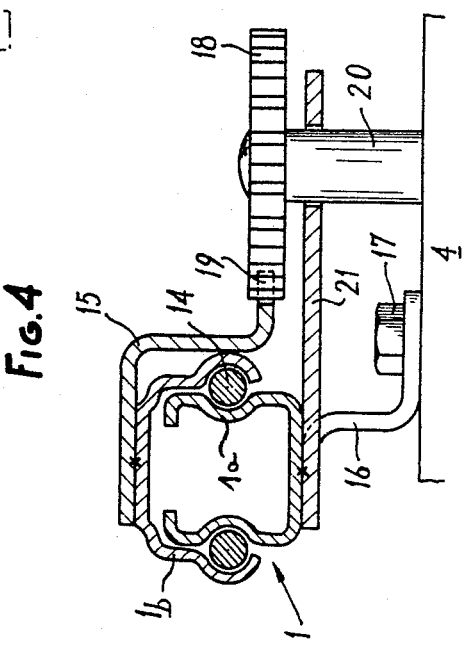

CURVED SLIDE MEMBER

BACKGROUND OF THE INVENTION

This invention relates to curved slide members formed of two curved and parallel sections. Such slide members are provided particularly for the longitudinal setting, both frontwardly and rearwardly, of a vehicle seat, in such manner that the seat will provide, for a person occupying the seat, a seated position and a lying position, as well as any intermediate position therebetween.

In the application of the curved slide members of the invention to a seat of a vehicle, one of the sections is fixed to the floor of the vehicle and the other section is fixed underneath the seat and moves therewith. The fixed section carries a pinion meshing with the toothing of a rack rigidly connected to the mobile section. The pinion drives in translation the mobile section with respect to the fixed section. The pinion can be a part of a reduction gear unit with an endless screw and a toothed wheel so as to provide for a non reversibility of its rotation.

SUMMARY OF THE INVENTION

According to the invention, the slide member comprises an inner section and an outer section, a Z-shaped rack mounted on one of the inner and outer sections, and a pinion carried by another one of the inner and outer sections and meshing with a toothing of the rack.

In a first embodiment of the invention, the Z-shaped rack is mounted on the mobile section, and the pinion of the reduction gear unit is rigidly connected to the fixed section. In a second embodiment, the rack is rigidly connected to the fixed section and the pinion to the mobile section.

Various other features of the invention will become more apparent from the following detailed description.

BRIEF DESCRIPTION OF THE DRAWINGS

Embodiment of the invention are shown by way of non limiting examples in the accompanying drawings, wherein:

FIG. 1 is a general schematic view of a slide member carrying a seat and mounted on the floor of a vehicle;

FIG. 2 is a front view of the slide member;

FIG. 3 is a top view of the slide member;

FIG. 4 is a partial cross-sectional view along line IV—IV of FIG. 2; and

FIG. 5 is a cross-sectional view similar to FIG. 4 of an alternative embodiment.

DETAILED DESCRIPTION

In the drawings, the curved slide member of the invention is generally designated by reference numeral 1.

In FIG. 1, the curved slide member 1 has a fixed section 1a and a mobile section 1b and is connected by uprights 2 to the floor 3 of a vehicle. The fixed section 1a of the slide member 1 carries a reduction gear unit 4 for driving the mobile section 1b, and the purpose of which will be better understood via the following disclosure. The reduction gear unit 4 is also fixed via its body 5 to the floor 3 of the vehicle.

The fixed section 1a of the slide member 1 is thereby suitably secured to the floor 3 of the vehicle, on the one hand via the uprights 2 and on the other hand via the body 5 of the reduction gear unit 4.

The mobile section 1b of the slide member 1 carries a seat 6 and, by controlling the reduction gear unit 4, it is possible to drive in translation the section 1b which, due to the curvature of the slide member 1, provides for a person occupying the seat 6, to reach a seated position, a lying position, or any intermediate position therebetween.

In FIGS. 2 to 4, there is shown in a more detailed manner the slide member of FIG. 1 as well as the reduction gear unit 4 connected thereto.

The reduction gear unit 4 is made of a reduction gear unit of the type generally used in motorized window lifting devices of the doors of motor vehicles, and comprises a portion 7 forming a motor and a portion 8 forming a reduction unit. An electric plug 9 provides for connection to an electric power supply (not shown).

The outer mobile section 1b comprises a screw 10 and nut 11 arrangement for fixation of the seat 6 of FIG. 1.

The inner fixed section 1a comprises nuts 12 for fixation to the uprights 2.

Balls 13 are provided between the fixed section 1a and the mobile section 1b, and braces 14 are used for maintaining the balls 13 in their position.

According to the invention, a Z-shaped rack 15 is attached, for example by soldering, to the mobile section 1b, and the reduction gear unit 4, which is attached to the fixed section 1a via a lug 16 and nuts 17, has its pinion 18 meshing with the toothing 19 of the rack 15.

Reference numeral 20 designates the driving pole of the pinion 18 of the reduction gear unit 4, and the pole 20 is maintained by a platen 21 attached to the fixed section 1a. The reduction gear unit 4 is of the endless screw and toothed wheel type so as to impart a non reversible character to rotation of the pinion 18.

It is therefore noted that according to the direction of rotation of the pinion 18 (that is according to polarity of the voltage applied to the electric plug 9 of the reduction gear unit 4), the mobile section 1b moves in one direction or the other with respect to the fixed section 1a by an engagement of the toothing 19 of the rack 15 (carried by the mobile section 1b) with the pinion 18 of the reduction gear unit 4 (rigidly connected to the fixed section 1a).

In FIG. 5 which shows an alternative embodiment, it is the fixed section 1a which carries a rack 15' similar to the rack 15 of the previous figures. Reference numeral 20' designates a driving pole of the pinion of a reduction gear unit similar to the reduction gear unit 4, but which is rigidly connected to the mobile section 1b and moves therewith. A lug 22 is fixed to the mobile section 1b for maintaining the pole 20' and the reduction gear unit 4.

Thus, as seen hereabove with reference to FIG. 1 and due to the curved shape of the slide member 1 (which has radius of curvature for example in a range between 500 and 800 mm), a seat 6 fixed to the mobile section 1b can occupy, during the displacement in translation of the section, a succession of positions between a seated position and a lying position for the person occupying the seat.

Although not shown, it is obvious that in the variant of FIG. 5, the reduction gear unit 4 is not fixed via its body 5 to the floor 3 of the vehicle, as in the preferred application of the embodiment of FIGS. 2 to 4, but underneath the seating portion of the seat and on the lug 22.

It is also possible to have, associated with the reduction gear unit 4, a known device permitting to store in a memory the position of the slide member which is determined by the reduction gear unit.

Likewise and as shown in a schematic manner in FIG. 5, a braking device shown at 23 can be provided for stopping the rotation of the pinion in case of a manual actuation of the pinion for tilting the seat. In such a case, there is obviously no reduction gear unit, and the pole 20' of the pinion 18 is rotatably mounted directly on the lug 22.

The present invention is, of course, in no way restricted to the specific disclosure of the specification and drawings, but also encompasses any modifications within the scope of the appended claims.

We claim:

1. A curved slide member formed of two curved and parallel sections as provided with horizontal control means in a side of an arcuate movable member particularly for longitudinal setting of a vehicle seat both frontwardly and rearwardly for a person occupying the seat to have a seated position as well as a lying position and also any intermediate position therebetween, comprising in combination:
   an inner section included as one of the two curved and parallel sections;
   an outer section included also as one of the two curved and parallel sections, with one of said inner and outer sections being movable as a mobile section relative to the other as a fixed section, which is fixed to a floor of the vehicle;
   a Z-shaped rack additionally fixedly mounted on one of said inner and outer sections, said rack having a toothing; and
   a pinion carried by that inner section or outer section on which said Z-shaped rack is not mounted, said pinion being in meshing engagement with said toothing of said rack so that said pinion drives in translation the mobile section with respect to the fixed section;
   said inner and outer sections having a radius of curvature in a range of from 500 to 800 mm, said outer section being mobile;
   means for preventing accidental reversal of the rotation of said pinion;
   a device having a memory for storing a given position of said slide member; and
   a locking device for stopping rotation of said pinion in the event of manual actuation.

2. A curved slide member according to claim 1, in which said rack is mounted on said outer section.

3. A curved slide member according to claim 2, which includes a reduction gear unit connected to said inner section, which is fixed; and in which said pinion is a part of said reduction gear unit.

4. A curved slide member according to claim 1, in which said rack is mounted on said inner section, which is fixed.

5. A curved slide member according to claim 4, which includes a reduction gear unit attached to said mobile outer section; and in which said pinion is a part of said reduction gear unit.

* * * * *